United States Patent [19]

Flaherty, Jr. et al.

[11] 4,356,381

[45] Oct. 26, 1982

[54] WARMING PLATE MOUNTING ARRANGEMENT IN A SINGLE-PASS DRIP-TYPE ELECTRIC COFFEEMAKER

[75] Inventors: John J. Flaherty, Jr., West Hartford; Gus W. Wallin, Waterbury, both of Conn.

[73] Assignee: Scovill Inc., Waterbury, Conn.

[21] Appl. No.: 192,904

[22] Filed: Oct. 1, 1980

[51] Int. Cl.³ .................. A47J 31/00; H05B 1/02; F24H 1/12
[52] U.S. Cl. .................................. 219/283; 99/281; 99/288; 99/307; 219/297; 219/301; 219/302; 219/308; 219/526; 219/536
[58] Field of Search ............... 219/296, 297, 301, 302, 219/308, 283, 464, 526, 536; 99/279, 281, 288, 307, 310, 312, 304

[56] References Cited

U.S. PATENT DOCUMENTS

| | | | |
|---|---|---|---|
| 3,591,753 | 7/1971 | Gartner | 219/464 |
| 3,632,983 | 1/1972 | Dills | 219/464 |
| 4,095,086 | 6/1978 | Ohnmacht et al. | 219/283 |
| 4,128,050 | 12/1978 | Petry | 219/283 X |
| 4,206,341 | 6/1980 | Leuschner et al. | 219/283 |

FOREIGN PATENT DOCUMENTS 2639523 3/1978 Fed. Rep. of Germany ...... 219/283
2733621 2/1979 Fed. Rep. of Germany ...... 219/283

*Primary Examiner*—A. Bartis
*Attorney, Agent, or Firm*—Dallett Hoopes

[57] ABSTRACT

An electric single-pass drip-type coffeemaker includes a plastic base having an upper half with an opening surrounded by a downward lip. A metal warming plate closes the opening and is laterally immobilized by downwardly projecting spaced bosses around the opening. A central upward protuberance on the lower half of the base terminates in a high temperature silicone pad which engages the underside of the warming plate and presses the plate up against a gasket seated in a groove in the lip to vertically immobilize the warming plate between the lip and the silicone pad when the upper and lower base halves are secured together. A U-shaped metallic extrusion is welded or soldered to the underside of the warming plate and includes an upper passage containing an electric heating element controlled by an adjustable thermostat secured to the extrusion and a lower water heating passage connected to the cold water reservoir and hot water discharge spout of the coffeemaker.

3 Claims, 5 Drawing Figures

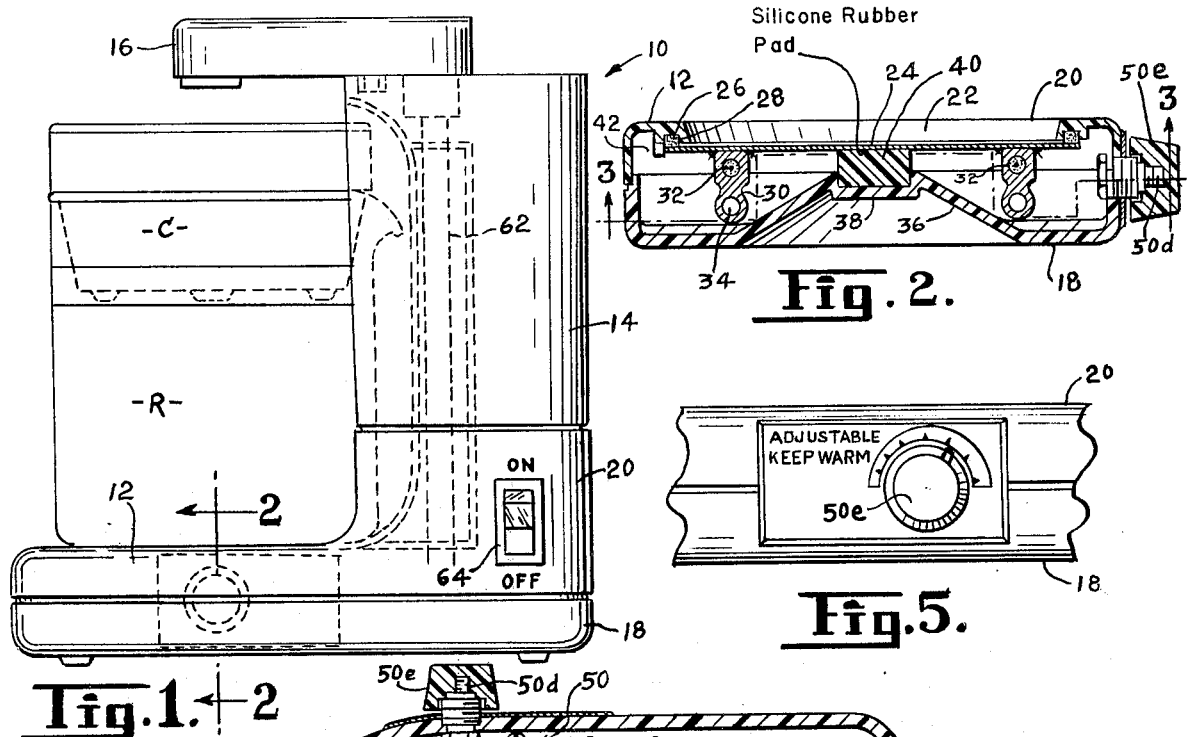
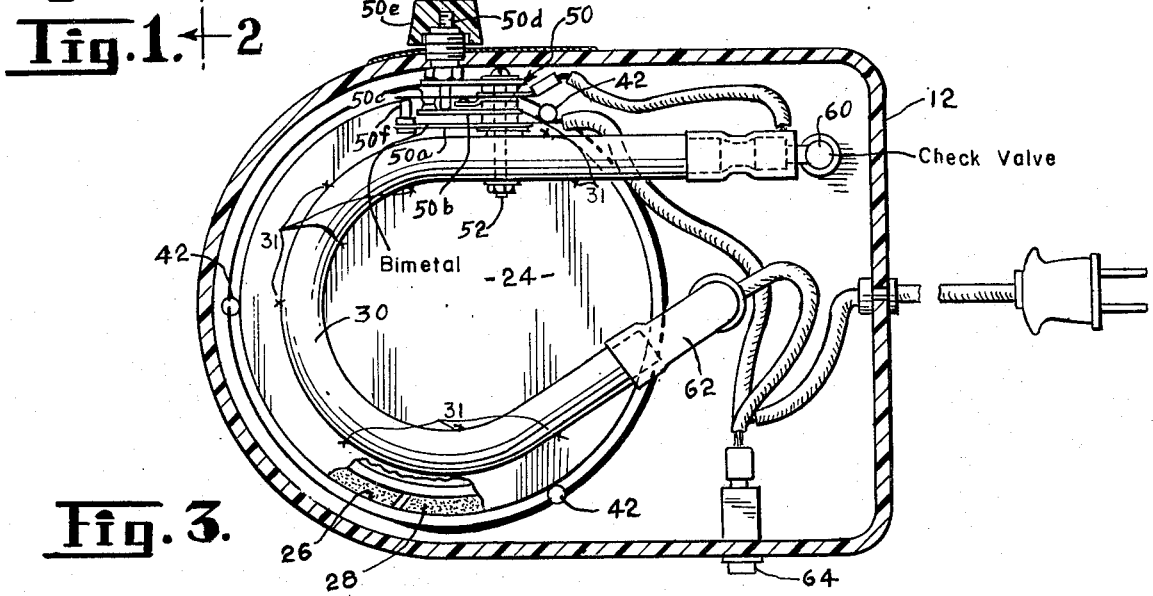
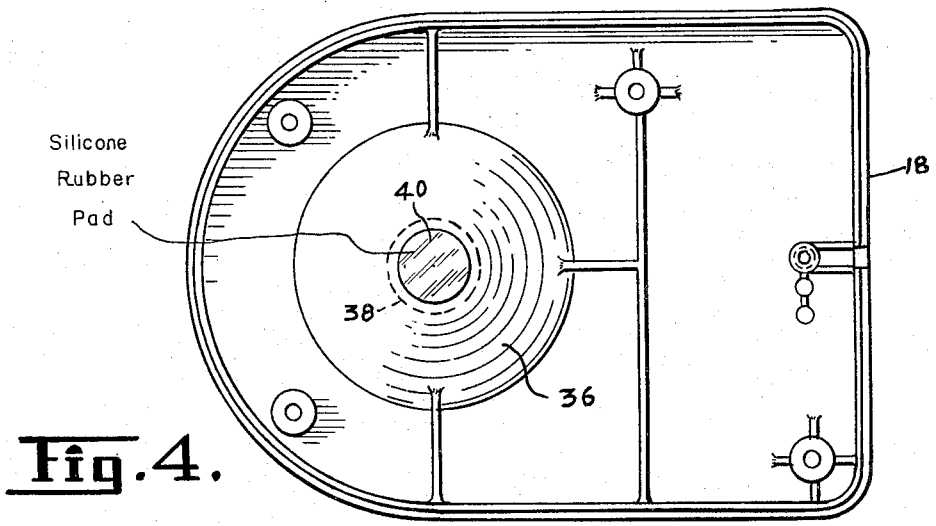

WARMING PLATE MOUNTING ARRANGEMENT IN A SINGLE-PASS DRIP-TYPE ELECTRIC COFFEEMAKER

BACKGROUND OF THE INVENTION

1. Field of the Invention:

This invention relates to a single-pass drip-type coffeemaker in which water from a reservoir tank is conducted to a flow-through heater and then to a spout overhanging a coffee bed over a coffee receiver. The receiver sits on a keep-warm plate.

2. Description of the Prior Art:

In the prior art there are a number of flow-through-heater-type coffeemakers. An example is shown in U.S. Pat. No. 3,902,408 which issued Sept. 2, 1975 to Fuhner. This patent shows a flow-through arrangement as described but in which the keep-warm plate is in the form of a casting into which the heater element is cast, the casting being bolted to the plastic housing of the coffeemaker. Another interesting structure is shown in U.S. Pat. No. 3,711,681 to Lauschner et al. In this patent, the flow-through heater is secured to the heating plate by both brazing and clamping.

SUMMARY OF THE INVENTION

In the present invention, the flow-through heater is secured to the keep-warm plate by welding or soldering without the aid of any other fasteners, and molded lugs in the housing laterally immobilize the keep-warm plate. The lower half of the housing has a central upward protuberance which terminates in a high-temperature-resistant silicon pad which urges the heater plate upward against the undersurface of the housing. In addition, externally adjustable temperature control means for the heater are provided to control the temperature of the keep-warm plate.

BRIEF DESCRIPTION OF THE DRAWINGS

Other objects and features of the invention will be apparent from references to the following specification including the claims and drawings, all of which disclose a non-limiting embodiment of the invention. In the drawings:

FIG. 1 is a side elevational view of a coffeemaker embodying the invention;

FIG. 2 is a sectional view taken on the line 2—2 of FIG. 1;

FIG. 3 is a sectional view taken on the line 3—3 of FIG. 2 with a portion shown broken away to disclose the keep-warm gasket;

FIG. 4 is an elevational view of the lower half of the base; and

FIG. 5 is an enlarged fragmentary view, partly in section, showing the control for the adjustable thermostat.

DESCRIPTION OF THE PREFERRED EMBODIMENT

Referring more specifically to the drawings, the coffeemaker embodying the invention is designated 10 in FIG. 1. It comprises a base 12, an upstanding reservoir 14 mounted at the rear of the base, and a spout 16 superposing the reservoir and adapted to deliver hot water to a coffee bed C from which the coffee drops to the underlying receivor R.

More specifically, the base may comprise two moldings, a lower half 18 and an upper half 20. The upper half, as is conventional, is formed with a circular opening 22 through which is exposed the warm-up plate 24. As shown (FIG. 3), the lip of the opening is formed with a downwardly facing annular groove 26 which receives a length of gasket material 28 against which the upper surface of the warm-up plate 24 presses.

As shown in FIG. 3, to the underside of the warm-up plate 24 is secured a generally "U"-shaped extrusion 30 as by welding or soldering as represented at 31 by X's. In cross section, this extrusion comprises an upper passageway 32 enclosing an insulated heating element (FIG. 2) and a lower passage 34 adapted to permit the flow of water.

As shown best in FIG. 2, the lower half 18 of the base has a central upstanding dome or projection 36 which includes a central well 38 receiving a pad 40 of temperature-resistant silicone. The upper surface of the silicone presses against the underside of the warm-up plate to hold the warm-up plate firmly against the underside of the gasket 28.

As shown in FIG. 3, the upper half of the base is formed with bosses 42 which laterally immobilize the warm-up plate in position in the opening 22. Thus, the combination of the bosses 42 and the silicone pad 40 completely support in a firm and rigid manner the warm-up plate and associated parts.

TEMPERATURE CONTROL

Adjustment of the keep-warm plate temperature is affected by an adjustable thermostat 50 mounted by a single fastener 52 in an opening in the extrusion 30 (FIG. 3). The thermostat contains a bi-metallic element 50a, the switchblade 50b adjustable to and away from the second switchblade 50c by means of a conventional adjusting screw 50d mounted exterior of the housing. For convenience, the screw 50d may be fitted with an operating knob 50e for manual adjustment. As shown, the bi-metallic element 50a is equipped with an insulating finger 50f which works against the blade 50c in the conventional manner.

As is conventional in such units, water from the reservoir 14 flows through a check valve at 60 (FIG. 3) by means of a hose into water passage 34. From the other end of the extrusion, the heated water is led by a second hose 62 to the spout 16. Electric wiring is provided, as shown, connecting the heater element, the on/off switch 64 and thermostat 50, all in series.

It will be apparent from the above construction that the temperature of the heating plate 24 may be adjusted by dialing the thermostat 50. This adjustability provides a desirable control of the temperature of the coffee liquid to meet individual tastes.

Having described the invention as it has been embodied in a single structure, it should be clear that variations may be made, all of which fall under the invention and within the ambit of the following claim language and equivalents thereof.

We claim:

1. An electric single-pass drip-type coffeemaker comprising a plastic base having upper and lower halves, the upper half having an upper surface formed with opening adjacent the front thereof, the opening surrounded by a downward lip, a reservoir extending up at the rear of the base of a product spout at the top of the reservoir, a metal warming plate laterally immobilized in the opening by a plurality of downward projections on the upper half, a generally U-shaped extrusion secured against the underside of the warming plate, the extrusion having an upper passage containing a heating element and a lower passage for conducting liquid and having first and second ends, first conduit means containing check valve means and connecting the reservoir and the first end and second conduit means connecting the second end and the spout, electrically conductive means for supplying current to the heating element, the lower half of the base having a central upward boss terminating upwardly in a silicone pad engaging and supporting the underside of the warming plate up against the lip to immobilize the plate vertically when the upper and lower halves are held together, and means holding together the upper and lower halves of the base.

2. An electric drip-type coffeemaker as claimed in claim 1 wherein the upper half of the base is formed with a downward annular groove in the lip about the opening and a length of gasket material is disposed in the groove and engages the warming plate.

3. An electric drip-type coffeemaker as claimed in claim 1 wherein the electrically conductive means includes an adjustable thermostat switch secured to the extrusion.

* * * * *